Oct. 9, 1923.
C. GABRIELSON
1,469,953
SNAP GAUGE
Filed April 6, 1921
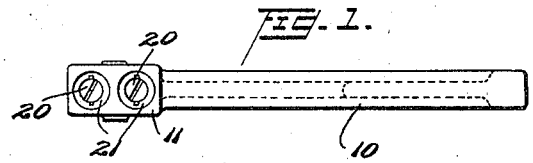
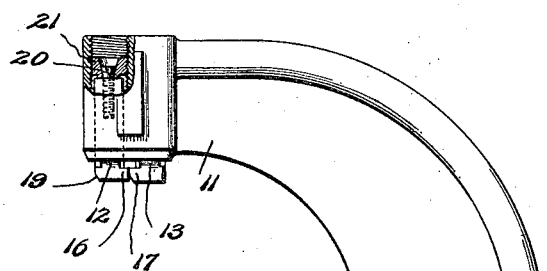
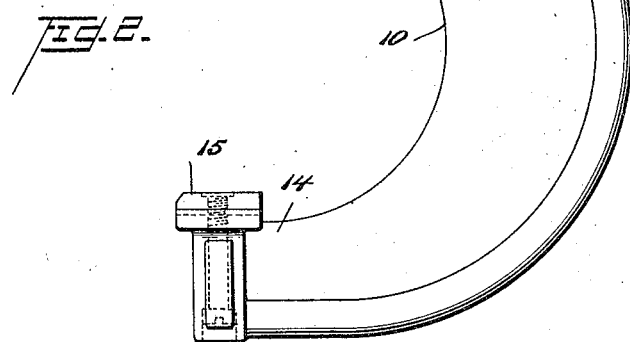
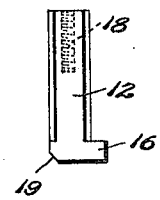
Inventor
Carl Gabrielson,
By Watson, Coit, Morse & Grindle,
Attys Patented Oct. 9, 1923.

1,469,953

UNITED STATES PATENT OFFICE.

CARL GABRIELSON, OF SYRACUSE, NEW YORK.

SNAP GAUGE.

Application filed April 6, 1921. Serial No. 458,879.

*To all whom it may concern:*

Be it known that I, CARL GABRIELSON, a citizen of the United States, residing at Syracuse, in the county of Onondaga and State of New York, have invented certain new and useful Improvements in Snap Gauges, of which the following is a specification.

This invention relates to snap gauges of the type embodying a plurality of separately adjustable measuring pins mounted in a frame one behind the other in the line of approach to the work, and in which the measuring or work surface of one pin is normally set inwards towards the path of the work a predetermined distance beyond that of the preceding pin, whereby when one pin passes over or across the work the next pin in the series may be brought in contact with the work to further measure or test the size. The measuring surfaces of adjacent pins are therefore not in the same plane, and in the forms heretofore in general use a considerable open or free space has been left between the measuring surfaces of adjacent pins, and this lack of support or guide for the gauge after the first pin leaves the work and before the second reaches it has led to defects and deficiencies in the operation, and to injury of and undue wear on the measuring pins which it is the object of the present invention to avoid. This invention therefore consists in novel means for preventing the gauge from dropping or getting out of proper line with the work surface after one pin passes over it and before the next pin reaches it. It avoids striking the work with the second pin or set of pins at such an angle as to cause undue wear. To this end the measuring pins are provided with heels or projecting portions at the working end, projecting towards the adjacent pin and in a sense bridging the space between them. The end surface of the heel or projection is in the same plane as the working face of the pin on which it is formed, and there is thus a practically continuous guide surface to the contact edge of the succeeding pin to bring that pin into proper contact with the work. A slight vertical movement of the gauge from contact with the measuring surface or heel of one pin is of course still necessary to bring it into the exact plane of the measuring surface of the next pin, but that small displacement is not sufficient to cause serious injury and furthermore is overcome or rendered ineffective to cause injury by beveling the contact edge of the pin sufficiently to serve as a guide and bring about an automatic centering. The novel features will be more fully understood from the following description and claims taken with the drawings.

In the drawings:

Figure 1 is an end view of the snap gauge looking down and showing the adjusting screws for the measuring pins.

Figure 2 is a side view of a limit snap gauge showing the features constituting my invention.

Figure 3 is a side view of one of the necessary pins having the novel construction, and Figure 4 is an end view of the pin from the end opposite that having the work surface.

In the drawings I have shown a well known form of snap gauge frame 10 having mounted in vertical parallel sockets near the end of upper arm 11 two measuring pins 12 and 13, one behind the other in reference to the work, and each is vertically adjustable in the sockets to project more or less from the lower side of the arm as desired by means well known in the art and which is threfore not specifically shown or described. In the particular embodiment shown, the lower arm 14 of the frame 10 has a single measuring plug or member 15 secured to its upper surface in fixed position by a screw and having its working face directly opposite and facing the working surfaces of pins 12 and 13, and it will be noted that the working face is continuous past the lines of both upper pins 12 and 13. This single fixed measuring surface on one arm is shown merely to illustrate one arragnement in which the novel form of adjustable measuring pins 12 and 13 may be advantageously used, and the invention is not limited to the use of a fixed lower measuring plug or to the use of a single lower plug or pin as distinguished from several.

The essentially novel features of the invention reside in the structure and arrangement of the upper measuring pins 12 and 13, and particularly in the form and relations of the projecting ends which make contact with the work. In the form shown, the front pin 12 has extending rearwardly therefrom a heel or projecting portion 16 terminating on a plane approximately midway between the facing surfaces of the bodies of the pins in arm 11, and measuring pin 13 has extending forwardly towards pin 12 a similar heel or projecting portion 17, terminating substantially half way between the pins, with its end immediately adjacent the end of heel 16. It will be observed that while the pins are separate and independently adjustable and the measuring surface on one pin and its heel is in a different horizontal plane from that on the succeeding pin and heel, those surfaces have their adjacent edges at substantially the same vertical transverse plane with no material break or open space between their adjacent edges such as would permit the working end of the second pin to drop or move vertically therein out of line with the work before reaching it, thus causing the contact edge of said pin to strike the work at a bad angle. The end surface of the pin and its heel therefore not only serve as a measuring surface but act as a guide surface against vertical displacement up to the plane of the contact edge of the measuring surface of the next pin in the series, and the surfaces of adjacent pins may therefore in a sense be said to constitute a continuous guide surface. It is of course preferable that both the upper and the lower arms of the gauge frame spanning the work and carrying the oppositely disposed measuring surfaces should be provided with means for guiding and preventing vertical displacement although its use on one arm only has decided advantages over the prior art. The forward edges of the measuring surfaces facing the work are preferably beveled as shown, and this forward beveled edge on any surface such as 19 after the first of the series constitutes a short inclined surface serving by contact with the work and through the forward movement of the gauge towards the work to so move or guide the gauge vertically that the measuring surface of that pin will be in the same plane as the top of the work.

In the form shown, the measuring pins 12 and 13 have shanks or portions fitting in sockets in the end of arm 11 which are substantially square in cross section, and the sockets are of course so shaped as to fit the pins preventing turning, but that feature in itself constitutes no part of the present invention, but is a useful element of the combination. The specific means for longitudinally adjusting and holding the pins in the socket form no part of the present invention but include a screw threaded bore 18 in the pin as shown in Fig. 3, and a screw 20, shown in Fig. 1, entering the arm socket from the top and engaging the screw threads in the bore of the pin. A sleeve 21 surrounds screw 20 above the pin, and the movement of the pin to desired adjusted position is effected by a proper relative turning of the screw and sleeve as is known in the art. It will be noted that in the form shown the projecting ends of pins 12 and 13 with their heels or projections form rectangular measuring surfaces with straight edges presented to the work, and are of uniform width. The invention however in its broader aspects is not limited to the particular form of the pin of means for adjustment so long as the working ends have lateral extensions or heels bringing about the cooperative action and improved results above described.

Having thus described my invention, what is claimed as new and desired to be secured by Letters Patent is:

1. A snap gauge comprising a frame, a contact member mounted on one arm thereof and a plurality of measuring pins mounted in the other arm of said frame at different distances from the end which faces the work, the outer projecting portions having end surfaces in planes at right angles to the longitudinal sides of the pins, the end work contacting surfaces being so shaped as to substantially bridge the space between the pins, thus preventing the gauge from dropping or moving vertically to a material extent after contact with one pin and before the next pin in the series makes contact with the work and means for longitudinally moving and adjusting said pins in said frame.

2. A snap gauge comprising a frame, a contact member mounted on one arm thereof and a plurality of measuring pins mounted in the other arm of said frame for separate and independent parallel adjustable movement spaced a fixed distance apart on the line of movement with the projecting portions having end surfaces in planes at right angles to the longitudinal sides of the pins, end work contacting surfaces so shaped and arranged with reference to each other as to substantially bridge the space between adjacent pins and form a continuous work surface from the contact edge of the pin nearest the work to the forward contact edge of the work surface of the next pin in the series and means for longitudinally moving and adjusting said pins in said frame.

3. A snap gauge comprising a frame, a contact member mounted on one arm thereof and a plurality of measuring pins mounted in the other arm of said frame for separate and independent parallel adjustable movement spaced a fixed distance apart on the line of movement, the projecting portions of the pins and the end work contacting surfaces thereof being provided with heels or extensions on the side next to the adjacent pin sufficient to substantially bridge the space between adjacent pins whereby the surface of one pin and its heel will so guide the gauge as to prevent material vertical displacement from proper position before the contact edge of the next pin reaches the work.

4. A snap gauge comprising a frame, a contact member mounted on one arm thereof and a plurality of measuring pins mounted in the other arm of said frame for separate parallel adjustable movement spaced a fixed distance apart on the line of movement, the projecting portions of the pins including lateral extensions on the side facing the adjacent pin extending approximately half way to that pin and the end work contacting surfaces thereof being rectangular in shape with a straight edge facing the work.

5. A snap gauge comprising a frame, a contact member mounted on one arm thereof and a plurality of measuring pins mounted in the other arm of said frame for separate parallel adjustable movement spaced a fixed distance apart on the line of movement, the projecting portions of the pins including lateral extensions on the side facing the adjacent pin extending approximately half way to that pin and the end work contacting surfaces thereof being rectangular in shape with a straight edge facing the work, the forward contact edges of said surfaces being beveled.

6. A snap gauge comprising a frame, a contact member mounted on one arm thereof and a plurality of measuring pins spaced apart in the line of movement of the gauge and mounted in the other arm of said frame for separate parallel adjustment for different size measurements, the contact or work contacting surface ends of the pins being in planes at right angles to the longitudinal lines of the pins as to continuously guide the movement of the gauge over the work, preventing dropping or objectionable vertical movement thereof after one work surface engages and commences to pass over the work and before the contact edge of the work surface of the adjacent pin reaches it.

7. A snap gauge comprising a frame, a contact member mounted on one arm thereof and a plurality of separate measuring pins mounted in the other arm thereof spaced apart on the line of movement and separately adjustable, the projecting flat measuring face or contacting surface of one pin extending substantially to the forward side of the projecting portion of the next adjacent pin in a plane slightly nearer to the supporting arm than the plane of the work surface of said adjacent pin, the forward contact edge of said adjacent pin being beveled to engage the work and be guided to position by the forward movement of the gauge.

In testimony whereof I hereunto affix my signature.

CARL GABRIELSON.